(12) United States Patent
Pathiyal

(10) Patent No.: US 11,263,609 B2
(45) Date of Patent: *Mar. 1, 2022

(54) METHOD, SYSTEM, AND COMPUTER PROGRAM PRODUCT FOR AUTOMATICALLY PROVIDING ITEMS BASED ON ITEM PREFERENCES

(71) Applicant: Visa International Service Association, San Francisco, CA (US)

(72) Inventor: Sanjay Pathiyal, Burlingame, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,824

(22) Filed: Oct. 21, 2020

(65) Prior Publication Data

US 2021/0049572 A1 Feb. 18, 2021

Related U.S. Application Data

(63) Continuation of application No. 16/540,114, filed on Aug. 14, 2019, now Pat. No. 10,839,361.

(51) Int. Cl.
*G06Q 20/18* (2012.01)
*G06Q 30/06* (2012.01)
*G06Q 20/32* (2012.01)

(52) U.S. Cl.
CPC ......... *G06Q 20/18* (2013.01); *G06Q 20/3278* (2013.01); *G06Q 30/0635* (2013.01); *G06Q 30/0641* (2013.01)

(58) Field of Classification Search
CPC .......................... G06Q 20/18; G06Q 20/3278
USPC .......................................... 238/381; 235/381
See application file for complete search history.

(56) References Cited

U.S. PATENT DOCUMENTS

| 7,177,042 | B2 | 2/2007 | Mimoto |
| 2014/0136365 | A1 | 5/2014 | Nista |
| 2014/0258030 | A1 | 9/2014 | Koch et al. |
| 2018/0330318 | A1 | 11/2018 | Alaparthy |
| 2019/0172119 | A1 | 6/2019 | Craft |

*Primary Examiner* — Allyson N Trail
(74) *Attorney, Agent, or Firm* — The Webb Law Firm

(57) ABSTRACT

A method for automatically providing items based on an item preference may include receiving payment credential data associated with a payment credential and preference data associated with an item preference of a user, determining whether one or more items associated with the item preference of the user is available, and processing, with at least one processor, a payment transaction involving the one or more items associated with the item preference of the user based on determining that the item is available. A system and a computer program product are also provided.

20 Claims, 6 Drawing Sheets

METHOD, SYSTEM, AND COMPUTER PROGRAM PRODUCT FOR AUTOMATICALLY PROVIDING ITEMS BASED ON ITEM PREFERENCES

CROSS REFERENCE TO RELATED APPLICATION

This application is a continuation of U.S. patent application Ser. No. 16/540,114, filed on Aug. 14, 2019, the disclosure of which is hereby incorporated by reference in its entirety.

BACKGROUND OF THE INVENTION

1. Field of the Invention

This disclosed subject matter relates generally to methods, systems, and products for providing items based on preferences and, in some particular embodiments or aspects, to a method, system, and computer program product for automatically providing items based on preferences.

2. Technical Considerations

Individuals often make repetitive purchases as part of their daily routine. For example, an individual may regularly purchase a soft drink and a snack from a vending machine at their place of business. Additionally, individuals may purchase beverages and/or snacks at a coffee shop. However, in each of these cases, such individuals need to manually intervene to complete the purchase.

At a vending machine, for example, individuals may need to browse the contents available, identify the position of the goods they want to purchase, and manually provide money and a code to complete the purchase. This process may also be reiterated, depending on how many items the individual wants to purchase. Similarly, when visiting coffee shops, individuals may need to wait in a line, communicate details for the order to the cashier (e.g., the item or items being purchased, the name of the individual, and/or the like), and initiate payment (e.g., by swiping a credit card, inserting a chip card, providing cash, and/or the like). These systems and methods can be inefficient, however, with individuals repeating certain processes and/or waiting in line and engaging with staff to obtain the good and/or service the individual is purchasing. Additionally, by virtue of human error, individuals may have to wait an increased amount of time if the order is identified and/or prepared incorrectly.

SUMMARY OF THE INVENTION

Accordingly, disclosed are computer-implemented methods, systems, and computer program products for automatically providing items based on preferences.

According to some non-limiting aspects or embodiments, provided is a computer implemented method for providing items based on an item preference. The computer implemented method may include receiving, with at least one processor, payment credential data associated with a payment credential and preference data associated with an item preference of a user; determining, with at least one processor, whether one or more items associated with the item preference of the user is available; and processing, with at least one processor, a payment transaction involving the one or more items associated with the item preference of the user based on determining that the item is available.

According to some non-limiting aspects or embodiments, provided is a system for providing items based on an item preference. The system may include at least one processor programmed or configured to: receive payment credential data associated with a payment credential and preference data associated with an item preference of a user; determine whether one or more items associated with the item preference of the user is available; and process a payment transaction involving the one or more items associated with the item preference of the user based on determining that the item is available.

According to some non-limiting aspects or embodiments, provided is a computer program product for providing items based on an item preference. The computer program product may include at least one non-transitory computer-readable medium comprising one or more instructions that, when executed by at least one processor, cause the at least one processor to: receive payment credential data associated with a payment credential and preference data associated with an item preference of a user; determine whether one or more items associated with the item preference of the user is available; and process a payment transaction involving the one or more items associated with the item preference of the user based on determining that the item is available.

Further non-limiting aspects or embodiments are set forth in the following numbered clauses:

Clause 1: A method for automatically providing items based on an item preference, the method comprising: receiving, with at least one processor, payment credential data associated with a payment credential and preference data associated with an item preference of a user; determining, with at least one processor, whether one or more items associated with the item preference of the user is available; and processing, with at least one processor, a payment transaction involving the one or more items associated with the item preference of the user based on determining that the item is available Clause 2: The method according to clause 1, wherein the payment credential data associated with a payment credential comprises account identifier data associated with an account identifier of an account of the user; and wherein processing the payment transaction involving the item associated with the item preference of the user comprises: processing, with at least one processor, the payment transaction involving the item associated with the one or more item preferences of the user using the account identifier of the account of the user.

Clause 3: The method according to clauses 1 or 2, further comprising: transmitting, with at least one processor, the preference data associated with the item preference of the user; and receiving, with at least one processor, an indication that the one or more items are available; and transmitting, with at least one processor, an indication that the payment transaction was authorized based on processing the payment transaction.

Clause 4: The method according to any of clauses 1-3, wherein processing the payment transaction comprises: generating, with at least one processor, a payment transaction authorization request comprising the payment credential and a transaction amount of the payment transaction based on the one or more items; transmitting, with at least one processor, the payment transaction authorization request; and receiving, with at least one processor, a payment transaction authorization response based on the payment transaction authorization request.

Clause 5: The method according to any of clauses 1-4, further comprising: causing, with at least one processor, the item to be dispensed based on processing the payment transaction involving the one or more items associated with the item preference of the user.

Clause 6: The method according to any of clauses 1-5, further comprising: determining, with at least one processor, that a mobile device of the user is located within a predetermined distance; and wherein receiving, with at least one processor, the payment credential data associated with the payment credential and the preference data associated with the item preference of the user comprises: receiving, with at least one processor, the payment credential data associated with the payment credential and the preference data associated with the item preference of the user when the mobile device is located within the predetermined distance.

Clause 7: The method according to any of clauses 1-6, wherein receiving the payment credential data associated with the payment credential and the preference data associated with the item preference of the user comprises: receiving the payment credential data associated with the payment credential and the preference data associated with the item preference of the user from a mobile device associated with the user via a short range wireless communication connection.

Clause 8: The method according to any of clauses 1-7, wherein determining whether the item associated with the item preference of the user is available comprises: determining that a first item associated with the item preference of the user is not available; and determining that a second item associated with the item preference of the user is available based on determining that the first item associated with the item preference of the user is not available.

Clause 9: A system for automatically providing items based on an item preference, the system comprising: at least one processor programmed or configured to: receive payment credential data associated with a payment credential and preference data associated with an item preference of a user; determine whether one or more items associated with the item preference of the user is available; and process a payment transaction involving the one or more items associated with the item preference of the user based on determining that the item is available.

Clause 10: The system according to clause 9, wherein the payment credential data associated with a payment credential comprises account identifier data associated with an account identifier of an account of the user; and wherein, when processing the payment transaction involving the item associated with the item preference of the user, the at least one processor is programmed or configured to: process the payment transaction involving the item associated with the one or more item preferences of the user using the account identifier of the account of the user.

Clause 11: The system according to clauses 9 or 10, wherein the at least one processor is further programmed or configured to: transmit the preference data associated with the item preference of the user; receive an indication that the one or more items are available; and transmit an indication that the payment transaction was authorized based on processing the payment transaction.

Clause 12: The system according to any of clauses 9-11, wherein, when processing the payment transaction, the at least one processor is programmed or configured to: generate a payment transaction authorization request comprising the payment credential and a transaction amount of the payment transaction based on the one or more items; transmit the payment transaction authorization request; and receive a payment transaction authorization response based on the payment transaction authorization request.

Clause 13: The system according to any of clauses 9-12, wherein the at least one processor is further programmed or configured to: cause the item to be dispensed based on processing the payment transaction involving the one or more items associated with the item preference of the user.

Clause 14: The system according to any of clauses 9-13, wherein the at least one processor is further programmed or configured to: determine that a mobile device of the user is located within a predetermined distance; and wherein, when receiving the payment credential data associated with the payment credential and the preference data associated with the item preference of the user, the at least one processor is programmed or configured to: receive the payment credential data associated with the payment credential and the preference data associated with the item preference of the user when the mobile device is located within the predetermined distance.

Clause 15: The system according to any of clauses 9-14, wherein, when receiving the payment credential data associated with the payment credential and the preference data associated with the item preference of the user, the at least one processor is programmed or configured to: receive the payment credential data associated with the payment credential and the preference data associated with the item preference of the user from a mobile device associated with the user via a short range wireless communication connection.

Clause 16: The system according to any of clauses 9-15, wherein, when determining whether the item associated with the item preference of the user is available, the at least one processor is programmed or configured to: determine that a first item associated with the item preference of the user is not available; and determine that a second item associated with the item preference of the user is available based on determining that the first item associated with the item preference of the user is not available.

Clause 17: A computer program product for automatically providing items based on an item preference, the computer program product comprising at least one non-transitory computer-readable medium comprising one or more instructions that, when executed by at least one processor, cause the at least one processor to: receive payment credential data associated with a payment credential and preference data associated with an item preference of a user; determine whether one or more items associated with the item preference of the user is available; and process a payment transaction involving the one or more items associated with the item preference of the user based on determining that the item is available.

Clause 18: The computer program product according to clause 17, wherein the payment credential data associated with a payment credential comprises account identifier data associated with an account identifier of an account of the user; and wherein, the one or more instructions that cause the at least one processor to process the payment transaction involving the item associated with the item preference of the user, cause the at least one processor to: process the payment transaction involving the item associated with the one or more item preferences of the user using the account identifier of the account of the user.

Clause 19: The computer program product according to clauses 17 or 18, wherein the one or more instructions further cause the at least one processor to: transmit the preference data associated with the item preference of the user; receive an indication that the one or more items are available; and transmit an indication that the payment transaction was authorized based on processing the payment transaction.

Clause 20: The computer program product according to any of clauses 17-19, wherein, the one or more instructions that cause the at least one processor to process the payment transaction, cause the at least one processor to: generate a payment transaction authorization request comprising the payment credential and a transaction amount of the payment transaction based on the one or more items; transmit the payment transaction authorization request; and receive a payment transaction authorization response based on the payment transaction authorization request.

Clause 21: The computer program product according to any of clauses 17-20, wherein the one or more instructions further cause the at least one processor to: cause the item to be dispensed based on processing the payment transaction involving the one or more items associated with the item preference of the user.

Clause 22: The computer program product according to any of clauses 17-21, wherein the one or more instructions further cause the at least one processor to: determine that a mobile device of the user is located within a predetermined distance; and wherein the one or more instructions that cause the at least one processor to receive the payment credential data associated with the payment credential and the preference data associated with the item preference of the user cause the at least one processor to: receive the payment credential data associated with the payment credential and the preference data associated with the item preference of the user when the mobile device is located within the predetermined distance.

Clause 23: The computer program product according to any of clauses 17-22, wherein the one or more instructions that cause the at least one processor to receive the payment credential data associated with the payment credential and the preference data associated with the item preference of the user cause the at least one processor to: receive the payment credential data associated with the payment credential and the preference data associated with the item preference of the user from a mobile device associated with the user via a short range wireless communication connection.

Clause 24: The computer program product according to any of clauses 17-23, wherein the one or more instructions that cause the at least one processor to determine whether the item associated with the item preference of the user is available cause the at least one processor to: determine that a first item associated with the item preference of the user is not available; and determine that a second item associated with the item preference of the user is available based on determining that the first item associated with the item preference of the user is not available.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary aspects or embodiments that are illustrated in the accompanying figures, in which.

DESCRIPTION OF THE INVENTION

Figure 1:
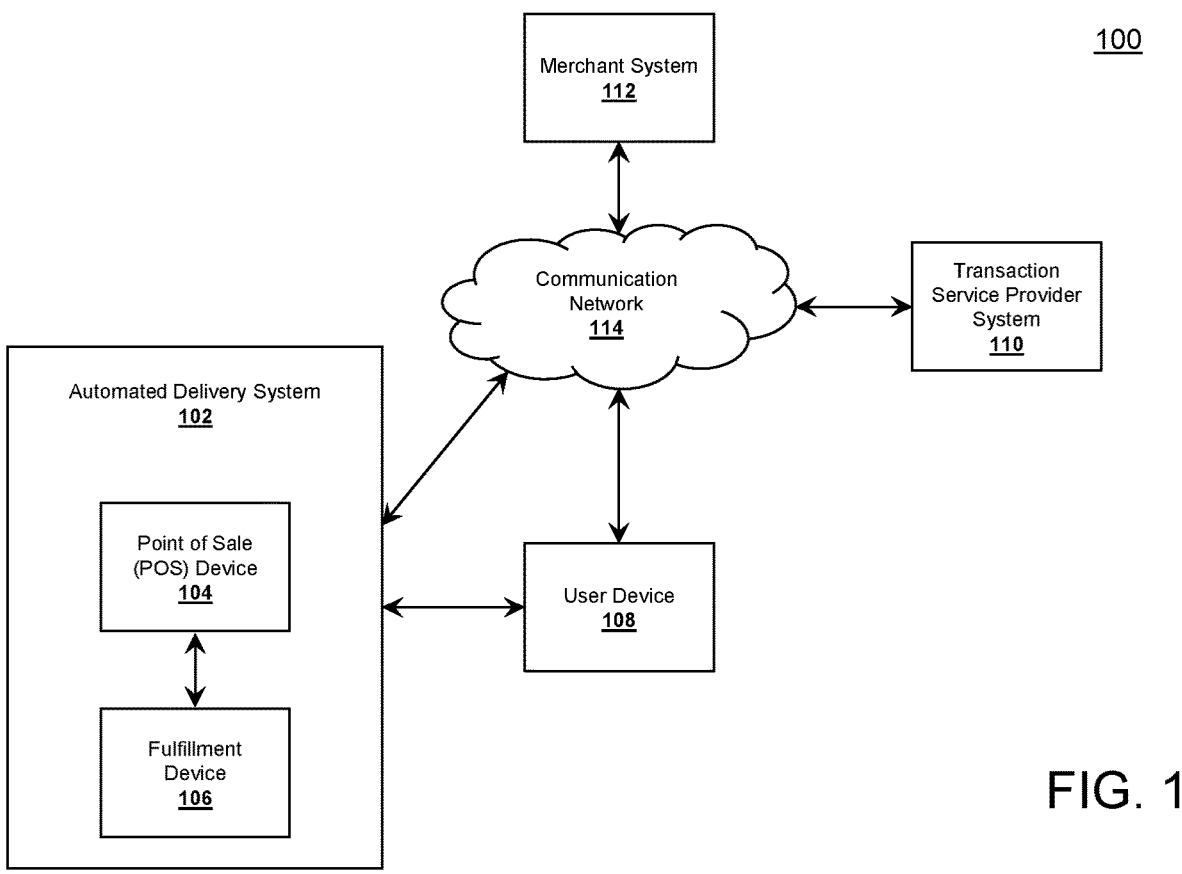
FIG. 1 is a diagram of a non-limiting aspect or embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit.

This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally, or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "POS system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments, a transaction service provider may include a credit card company, a debit card company, a payment network such as Visa®, MasterCard®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. In an embodiment, the term "payment device" may refer to a computing device. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. In some non-limiting embodiments, a computing device may include a mobile device. A mobile device may include a smartphone, a portable computer (e.g., a tablet, a laptop, and/or the like), a wearable device (e.g., watches, glasses, lenses, clothing, and/or the like), a personal digital assistant (PDA), a mobile connected device (e.g., a mobile Internet-of-Things (IOT) device, a mobile Web-of-Things (WOT) device, and/or the like), and/or other like devices. In some non-limiting embodiments, a computing device may include a server, a desktop computer, a connected device (e.g., a Internet-of-Things (IOT) device, a Web-of-Things (WOT) device, and/or the like), and/or the like.

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as one or more POS devices used by a merchant. In some non-limiting embodiments, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or clients.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Systems, methods, and computer program products for automatically providing items based on an item preference are disclosed. For example, methods may include receiving payment credential data associated with a payment credential and preference data associated with an item preference of a user, determining whether one or more items associated with the item preference of the user is available, and processing a payment transaction involving the one or more items associated with the item preference of the user based on determining that the item is available. In this way, resources associated with communications between a user device and an automated delivery system may be reduced. In addition, the time it takes to conduct a payment transaction involving an item may be reduced. For example, an individual may engage an automated delivery system with a user device, and as a result of receiving the profile data, the automated delivery system may process a payment transaction associated with an item and/or dispense the item desired by the user without the user manually providing input to indicate which items are desired. As a result, the time needed to complete a payment transaction is reduced, thereby freeing both the automated delivery system for another user faster as well as reducing the bandwidth consumed during communication between the automated delivery system and other systems (e.g., with a transaction service provider system, and/or the like) during the transaction.

Referring now to FIG. 1, FIG. 1 is a diagram of an example environment 100 in which devices, systems, and/or methods described herein may be implemented. As illustrated in FIG. 1, environment 100 may include automated delivery system 102, point-of-sale (POS) device 104, fulfillment device 106, user device 108, transaction service provider system 110, merchant system 112, and/or communication network 114. Automated delivery system 102, point-of-sale (POS) device 104, fulfillment device 106, user device 108, transaction service provider system 110, merchant system 112 may interconnect (e.g., establish a connection to communicate) via wired connections, wireless connections, or a combination of wired and wireless connections. In some non-limiting embodiments, automated delivery system 102 may be located in a predetermined distance associated with a merchant such as, without limitation, a structure, a building, a store (e.g., a brick and mortar location, a grocery store, and/or the like), and/or the like.

Automated delivery system 102 may include one or more devices capable of being in communication with user device 108, transaction service provider system 110, and/or merchant system 112 via communication network 114. For example, automated delivery system 102 may include one or more computing devices, such as a server, a group of servers, and/or the like. In some non-limiting embodiments, automated delivery system 102 may be associated with a merchant system and/or a transaction service provider system as described herein. In some non-limiting embodiments, automated delivery system 102 may be configured to communicate via a short range wireless communication connection (e.g., an NFC communication connection, an RFID communication connection, a Bluetooth® communication connection, and/or the like). In some non-limiting embodiments, automated delivery system 102 may include POS device 104 and/or fulfillment device 106. In some non-limiting embodiments, automated delivery system 102 may be associated with a merchant. In some non-limiting embodiments, automated delivery system 102 may be associated with a merchant location (e.g., a structure, a building, a store, a brick and mortar location, and/or the like) of a merchant. For example, automated delivery system 102 may be located at a merchant location (e.g., located within a merchant location, located within a predetermined distance of a merchant location, and/or the like) of the merchant.

POS device 104 may include one or more devices capable of being in communication with automated delivery system 102, fulfillment device 106, user device 108, transaction service provider system 110, and/or merchant system 112 via communication network 114. For example, POS device 104 may include a POS terminal, a group of POS terminals, and/or the like. In some non-limiting embodiments, POS device 104 may be associated with a merchant as described herein. In some non-limiting embodiments, POS device 104 may be configured to communicate via a short range wireless communication connection. In some non-limiting embodiments, POS device 104 may include a kiosk having a POS terminal. For example, POS device 104 may include a kiosk having a POS terminal located at a merchant location of a merchant (e.g., a kiosk at a Starbucks® location). In some non-limiting embodiments, POS device 104 may include an application (e.g., an application stored on POS device 104 such as a mobile device application, a native application for a mobile device, a mobile cloud application for a mobile device, a peer-to-peer payment transfer application, and/or the like) to carry out the functions described with regard to POS device 104.

Fulfillment device 106 may include one or more devices capable of being in communication with POS device 104. For example, fulfillment device 106 may include a smart vending, a vending machine, an automated teller machine (ATM), a computing device associated with a merchant, and/or the like. In some non-limiting embodiments, fulfillment device 106 may communicate via a short range wireless communication connection. In some non-limiting embodiments, fulfillment device 106 may be associated with a merchant as described herein. In some non-limiting embodiments, fulfillment device 106 may be associated with a predetermined distance associated with a merchant.

User device 108 may include one or more devices capable of being in communication with automated delivery system 102, POS device 104, transaction service provider system 110, and/or merchant system 112 via communication network 114. For example, user device 108 may include one or more computing devices, such as a mobile device, and/or the like. In some non-limiting embodiments, user device 108 may communicate via a short range wireless communication connection. In some non-limiting embodiments, user device 108 may be associated with a user as described herein. In some non-limiting embodiments, user device 108 may include an application associated with user device 108 (e.g., an application stored on user device 108 such as a mobile device application, a native application for a mobile device, a mobile cloud application for a mobile device, an electronic wallet application, a peer-to-peer payment transfer application, and/or the like).

Transaction service provider system 110 may include one or more devices capable of being in communication with automated delivery system 102, POS device 104, user device 108, and/or merchant system 112 via communication network 114. For example, transaction service provider system 110 may include one or more computing devices such as a server, a group of servers, and/or the like. In some non-limiting aspects or embodiments, transaction service provider system 110 may be associated with a transaction service provider as described herein.

Merchant system 112 may include one or more devices capable of being in communication with automated delivery system 102, POS device 104, user device 108, and/or transaction service provider system 110 via communication network 114. For example, merchant system 112 may include one or more computing devices configured to transmit and/or receive data to and/or from automated delivery system 102, POS device 104, fulfillment device 106, user device 108, and/or transaction service provider system 110 via communication network 114. In some non-limiting embodiments, merchant system 112 may include POS device 104. In some non-limiting embodiments, merchant system 112 may be associated with a merchant as described herein. In some non-limiting embodiments, merchant system 112 may be configured to communicate via a short range wireless communication connection. In some non-limiting embodiments, merchant system 112 may include an application associated with merchant system 112 (e.g., an application stored on merchant system 112 such as an application, a native application, a cloud application, a mobile device application, a native application for a mobile device, a mobile cloud application for a mobile device, an electronic wallet application, a peer-to-peer payment transfer application, and/or the like).

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
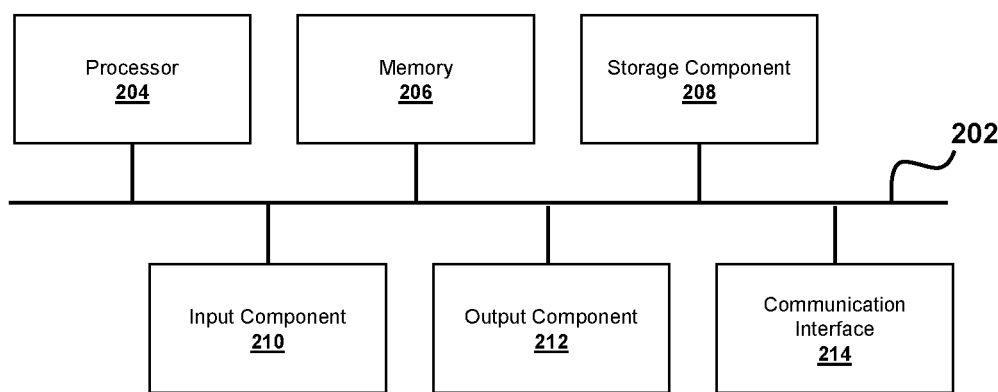
FIG. 2 is a diagram of a non-limiting aspect or embodiment of components of one or more devices and/or one or more systems of FIG. 1.

Referring now to FIG. 2, FIG. 2 is a diagram of example components of a device 200. Device 200 may correspond to automated delivery system 102 (e.g., one or more devices of automated delivery system 102), POS device 104, fulfillment device 106, user device 108, transaction service provider system 110 (e.g., one or more devices of transaction service provider system 110), and/or merchant system 112 (e.g., one or more devices of merchant system 112). In some non-limiting embodiments, automated delivery system 102, POS device 104, fulfillment device 106, user device 108, transaction service provider system 110, and/or merchant system 112 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 206 may include random access memory (RAM), read only memory (ROM), and/or another type of dynamic or static storage memory (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
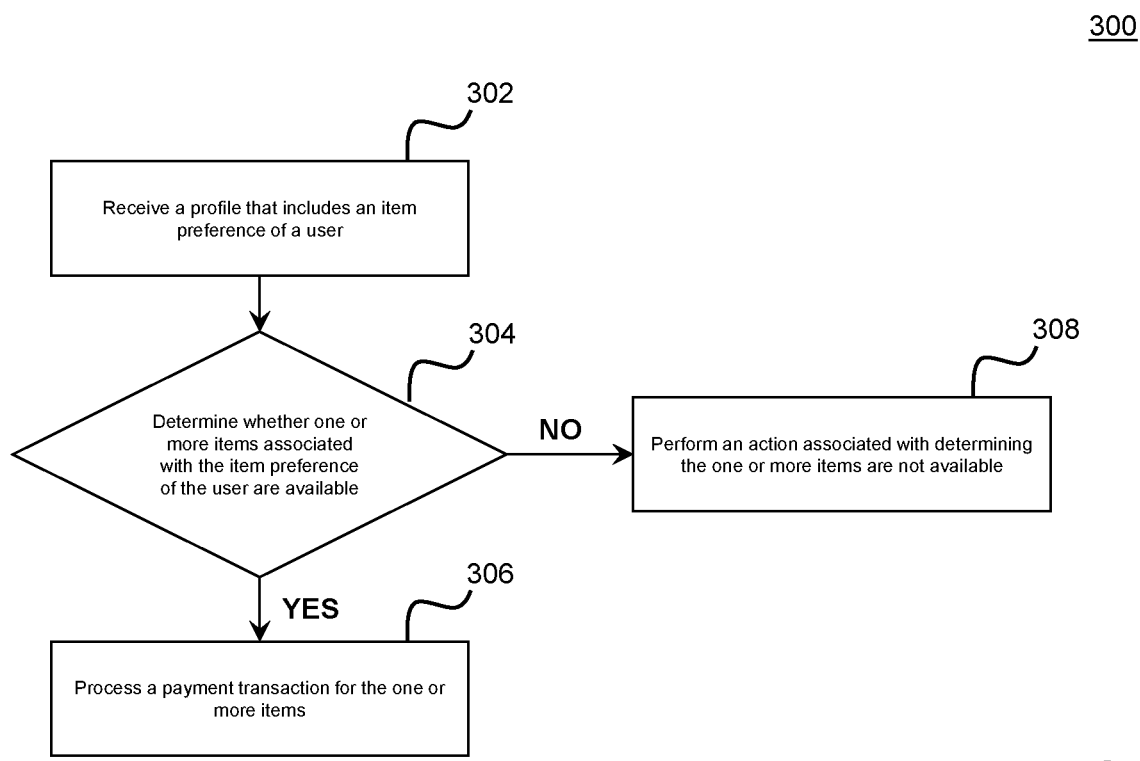
FIG. 3 is a flowchart of a non-limiting aspect or embodiment of a process for automatically providing items based on an item preference.

Referring now to FIG. 3, FIG. 3 is a flowchart of a non-limiting embodiment of a process 300 for providing items based on an item preference. In some non-limiting embodiments, one or more steps of process 300 may be performed (e.g., completely, partially, and/or the like) by automated delivery system 102 (e.g., one or more devices of automated delivery system 102, such as, point-of-sale (POS) device 104 and/or fulfillment device 106). In some non-limiting embodiments, one or more of the steps of process 300 may performed (e.g., completely, partially, and/or the like) by another device or a group of devices separate from or including automated delivery system 102 such as user device 108 (e.g., one or more devices of user device 108), transaction service provider system 110 (e.g., one or more devices of transaction service provider system 110), and/or merchant system 112 (e.g., one or more devices of merchant system 112). As described below, any functions performed by automated delivery system 102 may be performed by POS device 104 and/or fulfillment device 106 unless otherwise indicated.

As shown in FIG. 3, at step 302, process 300 includes receiving a profile that includes an item preference of a user. For example, automated delivery system 102 may receive a profile (e.g., a profile message) that includes one or more item preferences of a user from user device 108 (e.g., from user device 108 of the user via a short range wireless communication connection). In some non-limiting embodiments, a profile may include a list of item preferences of a user. For example, the profile may include the list of item preferences of the user in order based on a user's priority of the item preferences. The item preferences may be included in the list with an item preference having a highest priority to the user provided first and an item preference having a lowest priority to user provided last. In another example, the profile may include the list of item preferences of the user in order based on time intervals of the item preferences. The item preferences may be included in the list with an item preference having the earliest time interval user provided first and an item preference having the latest time interval provided last. In some non-limiting embodiments, a profile may include the list of item preferences of the user in order based on time intervals of the item preferences and based on a user's priority of the item preferences.

In some non-limiting embodiments, an item preferences may include one or more item parameters associated with one or more items. In some non-limiting embodiments, an item parameter may include an identifier of an item (e.g., a name of an item, a description of an item, a brand name of an item, and/or the like), an identifier of a size of an item (e.g., a description of a size of an item, a description of a size of a portion of an item, and/or the like), a time interval associated with an item (e.g., a time of day during which the item is likely to be purchased, one or more days of the week (e.g., Monday through Friday) during which the item is likely to be purchased, one or more days of the weekend (e.g., Saturday and/or Sunday) during which the item is likely to be purchased, a time of day and one or more days of the week (e.g., Monday through Friday) during which the item is likely to be purchased, a time of day and one or more days of the weekend (e.g., Saturday and/or Sunday) during which the item is likely to be purchased and/or the like), an identifier of a merchant from which the item is likely to be purchased (e.g., a name of a merchant), and/or an identifier of a merchant location at which the item is likely to be purchased (e.g., an address of a merchant location at which the item is likely to be purchased, an area associated with a merchant location at which the item is likely to be purchased, and/or the like).

In some non-limiting embodiments, a list of item preferences may include a list of one or more item parameters associated with one or more items. For example, the list of item preferences may include a list with a first item preference that includes a name of a first item (e.g., coffee), an identifier of a size of the first item (e.g., X-Large), a time interval associated with the first item (e.g., 7:00 am to 9:00 am), and/or one or more days of the week during which the first item is likely to be purchased (e.g., Monday). In such an example, the list may also include a second item preference that includes a name of a second item (e.g., tea), an identifier of a size of the second item (e.g., X-Large), a time interval associated with the second item (e.g., 7:00 am to 9:00 am), and/or one or more days of the week during which the second item is likely to be purchased (e.g., Monday).

In some non-limiting embodiments, the list of item preferences may include a list of item preferences that are ranked based on one or more item parameters associated with one or more items in the item preferences. In the example above, the first item preference may be included at a first position of the list (e.g., at the start of the list) and the second item preference may be included at a second position of the list, after the first item preference (e.g., at the end of the list). The first item preference may be included at the first position and the second item preference may be included at the second position, which is after the first position, based on the time interval of the first item preference being before the time interval of the second item preference and/or based on a user's priority of the first item preference being higher than the user's priority of the second item preference. In some non-limiting embodiments, the second item preference may be included in the list as an alternative (e.g., a substitute) for the first item preference. For example, the second item preference may be included in the list as an alternative for the first item preference if an item associated with the first item preference is determined not to be available. In such an example, an item associated with the second item preference may be involved in a payment transaction as an alternative for the item associated with the first item preference.

In the example described above, the list may also include a third item preference that includes a name of a third item (e.g., a candy bar), a time interval associated with the third item (e.g., 10:00 am to 11:00 am), and/or one or more days of the week during which the third item is likely to be purchased (e.g., Monday through Friday). In some non-limiting embodiments, the first item preference or the second item preference may be included at a first position of the list (e.g., at the start of the list) and the third item preference may be included at a second position of the list after the first item preference or the second item preference (e.g., at the end of the list), based on the time interval of the first item preference or the second item preference being before the time interval provided of the third item preference. In some non-limiting embodiments, the first item preference or the second item preference may be included at the first position of the list and the third item preference may be included at the second position of the list after the first preference or the second item preference based on a user's priority of the first item preference or the second item preference being higher than the user's priority of the third item preference. In some non-limiting embodiments, the third item preference may be included in the list as an alternative for the first item preference and the second item preference. For example, the third item preference may be included in the list as an alternative for the first item preference and the second item preference if an item associated with the first item preference is determined not to be available and an item associated with the second item preference is determined not to be available. In such an example, an item associated with the third item preference may be involved in a payment transaction as an alternative for the item associated with the first item preference and the second item preference.

In some non-limiting embodiments, a profile that includes an item preference of a user may be stored using a file format (e.g., in a file format associated with a data structure). For example, the profile may be stored in an XML file format, a JSON file format, an SQL file format, a NoSQL file format, and/or the like. In some non-limiting embodiments, automated delivery system 102 may store the profile. For example, automated delivery system 102 may store the profile in a data structure (e.g., a database) in a file format associated with the data structure based on receiving the profile.

In some non-limiting embodiments, automated delivery system 102 may receive preference data associated with one or more item preferences of a user. For example, automated delivery system 102 may receive a profile including a list of item preferences as the preference data associated with one or more item preferences of the user from user device 108 of the user via a short range wireless communication connection. The preference data may include one or more item parameters associated with one or more items.

Additionally, or alternatively, automated delivery system 102 may receive payment credential data associated with a payment credential (e.g., an account identifier of an account of the user, a token associated with an account of the user, and/or the like) of the user. For example, automated delivery system 102 may receive the payment credential data associated with the payment credential of the user from user device 108 of the user via a short range wireless communication connection.

In some non-limiting embodiments, automated delivery system 102 may receive a transaction initiation message. For example, automated delivery system 102 may receive a transaction initiation message that includes payment credential data associated with a payment credential and/or preference data associated with one or more item preferences of a user. In some non-limiting embodiments, automated delivery system 102 may receive the transaction initiation message from user device 108. For example, user device 108 may transmit the transaction initiation message via a short range wireless communication connection to automated delivery system 102. In some non-limiting embodiments, user device 108 may transmit the transaction initiation message to POS device 104 of automated delivery system 102 via the short range wireless communication connection.

In some non-limiting embodiments, automated delivery system 102 may determine that user device 108 is within a predetermined distance. For example, automated delivery system 102 may determine that user device 108 is within a predetermined distance of automated delivery system 102 (e.g., within a predetermined distance of POS device 104 and/or fulfillment device 106 of automated delivery system 102). In some non-limiting embodiments, user device 108 may determine that user device 108 is within a predetermined distance. For example, user device 108 may determine that user device 108 is within a predetermined distance of automated delivery system 102. In some non-limiting embodiments, automated delivery system 102 may receive the payment credential data associated with the payment credential and/or the preference data associated with the item preference of the user when user device 108 is located within the predetermined distance. For example, automated delivery system 102 may receive the payment credential data associated with the payment credential and/or the preference data associated with the item preference of the user when user device 108 is located within the predetermined distance via a short range wireless communication connection.

In some non-limiting embodiments, automated delivery system 102 may determine whether user device 108 is within a predetermined distance of automated delivery system 102 based on a location of user device 108. For example, automated delivery system 102 may receive location data associated with a location of user device 108 (e.g., coordinates of a location of user device 108). Automated delivery system 102 may determine a distance between the location of user device 108 and a location of automated delivery system 102 and automated delivery system 102 may compare the distance to a threshold. If the distance satisfies the threshold, automated delivery system 102 may determine that user device 108 is within the predetermined distance. If the distance does not satisfy the threshold, automated delivery system 102 may determine that user device 108 is not within the predetermined distance.

In some non-limiting embodiments, user device 108 may determine whether user device 108 is within a predetermined distance of automated delivery system 102 based on a location of user device 108. For example, user device 108 may determine a location of user device 108. User device 108 may determine a distance between the location of user device 108 and a location of automated delivery system 102 and user device 108 may compare the distance to a threshold. If the distance satisfies the threshold, user device 108 may determine that user device 108 is within the predetermined distance. If the distance does not satisfy the threshold, user device 108 may determine that user device 108 is not within the predetermined distance. In some non-limiting embodiments, user device 108 may transmit preference data associated with one or more item preferences of a user based on determining that user device 108 is within the predetermined distance. Additionally or alternatively, user device 108 may transmit payment credential data associated with a payment credential of the user based on determining that user device 108 is within the predetermined distance.

In some non-limiting embodiments, user device 108 may transmit preference data associated with one or more item preferences of a user based on determining that user device 108 is within the predetermined distance. Additionally, or alternatively, user device 108 may transmit payment credential data associated with a payment credential of the user based on determining that user device 108 is within the predetermined distance.

In some non-limiting embodiments, user device 108 may transmit a profile that includes one or more item preferences of the user of user device 108. For example, user device 108 may transmit the profile to automated delivery system 102. In some non-limiting embodiments, user device 108 may refine the profile that is to be transmitted to automated delivery system 102. For example, user device 108 may determine a criteria associated with an item preference (e.g., a time at which a profile is to be transmitted to automated delivery system 102) before transmitting the profile to automated delivery system 102. In such an example, user device 108 may compare the criteria to a list of item preferences included in the profile and remove an item preference from the list of item preferences if the criteria corresponds to one or more item parameters associated with one or more items included in the item preference. User device 108 may transmit the profile to automated delivery system 102 based on removing the item preference from the list of item preferences. In this way, user device 108 may reduce the amount of network resources, such as bandwidth associated with transmitting the profile to automated delivery system 102, as compared to a situation where user device 108 does not refine the profile. In one example, user device 108 may determine a time at which a profile is to be transmitted to automated delivery system 102 (e.g., 12:00 pm). User device 108 may compare the time to a time interval associated with an item included in a first item preference (e.g., 11:00 am to 1:00 pm) in a list of item preferences included in the profile. User device 108 may remove the first item preference from the list of item preferences based on determining that the time is within the time interval associated with the item and user device 108 may transmit the profile including the list of item preferences having the first item preference removed.

In some non-limiting embodiments, user device 108 may transmit the profile based on an item parameter associated with an item. For example, user device 108 may transmit the profile to automated delivery system 102 based on a time interval associated with an item (e.g., 1:00 pm to 4:00 am) of an item preference included in the list of item preferences in the profile. In such an example, user device 108 may determine a time (e.g., a real-time, a current time, and/or the like) and user device 108 may determine whether the time corresponds (e.g., is within, matches, and/or the like) to the time interval associated with the item. User device 108 may transmit the profile based on determining that the time corresponds to the time interval. In some non-limiting embodiments, user device 108 may transmit the profile based on a location of user device 108. For example, user device 108 may transmit the profile to automated delivery system 102 based on determining that a location of user device 108 corresponds to (e.g., matches, is within a predetermined distance of, and/or the like) a predetermined location.

In some non-limiting embodiments, automated delivery system 102 may determine that user device 108 is within a predetermined distance based on receiving the transaction initiation message via a short range wireless communication connection. For example, automated delivery system 102 may receive the transaction initiation message (e.g., by POS device 104) via the short range wireless communication connection and may determine that, based on receiving the transaction initiation message via the short range wireless communication connection, that user device 108 is within the predetermined distance.

In some non-limiting embodiments, automated delivery system 102 may receive a transaction initiation message when user device 108 is within a predetermined distance of automated delivery system 102. For example, user device 108 may forego transmitting the transaction initiation message until user device 108 is within a predetermined distance of automated delivery system 102 and automated delivery system 102 may receive the transaction initiation message when user device 108 is within the predetermined distance. In some non-limiting embodiments, automated delivery system 102 may determine that user device 108 is within the predetermined distance based on receiving the transaction initiation message. For example, POS device 104 of automated delivery system 102 may receive the transaction initiation message from user device 108 (e.g., via the short range wireless communication connection and/or via communication network 114) and automated delivery system 102 may, based on receiving the transaction initiation message, determine that user device 108 is within the predetermined distance.

In some non-limiting embodiments, POS device 104 may transmit preference data associated with one or more item preferences of a user (e.g., one or more item preferences included in a transaction initiation message) to fulfillment device 106. For example, POS device 104 may transmit the preference data associated with the one or more item preferences of the user based on receiving the preference data and/or based on POS device 104 and/or fulfillment device 106 determining that user device 108 is within the predetermined distance.

As shown in FIG. 3, at step 304, process 300 includes determining whether one or more items associated with the item preference of the user are available. For example, automated delivery system 102 may determine whether one or more items associated with the item preference of the user is available. In some non-limiting embodiments, automated delivery system 102 may determine whether one or more items associated with the item preference of the user are available based on preference data associated with an item preference of a user. For example, automated delivery system 102 may identify one or more items that correspond to the item preference of the user based on one or more item parameters associated with one or more items included in the preference data associated with the item preference of the user. In such an example, automated delivery system 102 may determine whether the one or more items are available based on identifying the one or more items.

In some non-limiting embodiments, automated delivery system 102 may determine whether one or more items associated with the item preference of the user are available based on one or more item parameters associated with one or more items. For example, automated delivery system 102 may determine the one or more item parameters that are included in preference data associated with an item preference of a user. Automated delivery system 102 may compare the one or more item parameters to a list of item parameters stored in a database (e.g., an inventory list of items stored in a database associated with automated delivery system 102, an inventory list of items stored in a database associated with POS device 104, an inventory list of items stored in a database associated with fulfillment device 106, and/or the like). If automated delivery system 102 determines that the one or more item parameters corresponds to one or more item parameters in the list of item parameters stored in the database, automated delivery system 102 may determine that the one or more items associated with the item preference of the user are available. If automated delivery system 102 determines that the one or more item parameters do not correspond to one or more item parameters in the list of item parameters stored in the database, automated delivery system 102 may determine that the one or more items associated with the item preference of the user are not available.

In some non-limiting embodiments, automated delivery system 102 may generate an item verification response message that includes an indication of whether the one or more items associated with the item preference are available. For example, automated delivery system 102 may determine that one or more items associated with the one or more item preferences of the user are available and automated delivery system 102 may generate the verification response message that includes an indication that the one or more items associated with the item preference are available. In another example, automated delivery system 102 may determine that one or more items associated with the one or more item preferences of the user are not available and automated delivery system 102 may generate the verification response message that includes an indication that the one or more items associated with the item preference are not available (e.g., that the one or more items associated with the item preference have been determined to not be available). In some non-limiting embodiments, automated delivery system 102 may transmit the item verification response message. For example, automated delivery system 102 may transmit the item verification response message to user device 108.

In some non-limiting embodiments, automated delivery system 102 may transmit an item confirmation request message. For example, automated delivery system 102 may transmit the item confirmation request message to user device 108 based on generating the item confirmation request message. In some non-limiting embodiments, the item confirmation request message may include a request for authorization to process a payment transaction involving the one or more items (e.g., a prompt for an input from a user associated with user device 108 to provide authorization to process a payment transaction involving the one or more items). Additionally, or alternatively, the item confirmation request message may include one or more item parameters associated with the one or more items. Additionally, or alternatively, the item confirmation request message may include data associated with a transaction amount of the payment transaction involving the one or more items.

In some non-limiting embodiments, automated delivery system 102 may receive an item confirmation response message. For example, automated delivery system 102 may receive the item confirmation response message from user device 108 based on (e.g., after) transmitting the item confirmation request message. In some non-limiting embodiments, the item confirmation response message may include a response to the request for authorization to process the payment transaction involving the one or more items. For example, the item confirmation response message may include an indication of whether to process the payment transaction involving the one or more items.

In some non-limiting embodiments, automated delivery system 102 may determine whether to process the payment transaction involving the one or more items. For example, automated delivery system 102 may determine whether to process the payment transaction involving the one or more items based on the item confirmation response message. In such an example, automated delivery system 102 may determine whether to process the payment transaction based on the indication of whether to process the payment transaction involving the one or more items.

In some non-limiting embodiments, automated delivery system 102 may determine whether the item confirmation response message includes an indication to process the payment transaction involving the one or more items or an indication to forego processing the payment transaction involving the one or more items. If automated delivery system 102 determines that the item confirmation response message includes an indication to process the payment transaction, automated delivery system 102 may determine to process the payment transaction. If automated delivery system 102 determines that the item confirmation response message includes an indication to forego processing the payment transaction, automated delivery system 102 may determine not to process the payment transaction.

In some non-limiting embodiments, POS device 104 of automated delivery system 102 may transmit preference data associated with an item preference of a user to fulfillment device 106 to cause fulfillment device 106 to determine whether the one or more items associated with the item preference of the user are available. In some non-limiting embodiments, POS device 102 and/or fulfillment device 106 may determine whether one or more items associated with the item preference of the user are available based on one or more item parameters associated with one or more items. For example, POS device 104 and/or fulfillment device 106 may determine the one or more item parameters that are included in preference data associated with an item preference of a user. POS device 102 and/or fulfillment device 106 may compare the one or more item parameters to a list of item parameters stored in a database (e.g., an inventory list of items stored in a database associated with automated delivery system 102, an inventory list of items stored in a database associated with POS device 104, an inventory list of items stored in a database associated with fulfillment device 106, and/or the like). If POS device 102 and/or fulfillment device 106 determines that the one or more item parameters corresponds to one or more item parameters in the list of item parameters stored in the database, POS device 102 and/or fulfillment device 106 may determine that the one or more items associated with the item preference of the user are available. If POS device 102 and/or fulfillment device 106 determines that the one or more item parameters do not correspond to one or more item parameters in the list of item parameters stored in the database, POS device 102 and/or fulfillment device 106 may determine that the one or more items associated with the item preference of the user are not available.

In some non-limiting embodiments, POS device 102 and/or fulfillment device 106 may generate an item verification response message that includes an indication of whether the one or more items associated with the item preference are available. For example, POS device 102 and/or fulfillment device 106 may determine that one or more items associated with the one or more item preferences of the user are available and POS device 102 and/or fulfillment device 106 may generate the verification response message that includes an indication that the one or more items associated with the item preference are available. In another example, POS device 102 and/or fulfillment device 106 may determine that one or more items associated with the one or more item preferences of the user are not available and POS device 102 and/or fulfillment device 106 may generate the verification response message that includes an indication that the one or more items associated with the item preference are not available.

As shown in FIG. 3, at step 306 ("YES" at step 304), process 300 includes processing a payment transaction involving the one or more items. For example, automated delivery system 102 may process the payment transaction involving the one or more items based on determining that the one or more items associated with the item preference of the user are available. In some non-limiting embodiments, automated delivery system 102 may process the payment transaction involving the one or more items based on determining to process the payment transaction.

In some non-limiting embodiments, automated delivery system 102 may process a payment transaction involving the one or more items based on determining that the one or more items are available. In some non-limiting embodiments, automated delivery system 102 may generate a payment transaction authorization request message including data associated with a payment credential of a user and/or transaction data associated with a transaction amount for the payment transaction. For example, automated delivery system 102 may generate the payment transaction authorization request message including data associated with the payment credential of the user and/or transaction data associated with the transaction amount for the payment transaction based on the one or more items. In some non-limiting embodiments, automated delivery system 102 may determine the transaction amount for the payment transaction based on the one or more items. In some non-limiting embodiments, automated delivery system 102 may transmit the payment transaction authorization request message to process the payment transaction. For example, automated delivery system 102 may transmit the payment transaction authorization request message to transaction service provider system 110 to process the payment transaction. In some non-limiting embodiments, automated delivery system 102 may receive a payment transaction authorization response message from transaction service provider system 110 and the payment transaction authorization response message may include an indication of whether the transaction was authorized.

In some non-limiting embodiments, automated delivery system 102 may process the payment transaction involving the one or more items based on using a payment credential of the user. For example, automated delivery system 102 may process a payment transaction involving the one or more items based on using an account identifier of the account of the user. In some non-limiting embodiments, automated delivery system 102 may transmit an indication (e.g., a message that includes an indication) that the payment transaction was authorized based on processing the payment transaction. For example, automated delivery system 102 may transmit an indication that the payment transaction was authorized to user device 108.

In some non-limiting embodiments, automated delivery system 102 may process the payment transaction involving the one or more items based on an item parameter associated with the one or more items. For example, automated delivery system 102 may process the payment transaction involving the one or more items based on a time interval associated with the one or more items (e.g., a time interval from 1:00 pm to 4:00 am associated with the one or more items) of an item preference included in a list of item preferences in a profile.

In some non-limiting embodiments, automated delivery system 102 may dispense an item or cause the item to be dispensed. For example, automated delivery system 102 may dispense an item or cause the item to be dispensed based on processing the payment transaction involving the one or more items associated with the item preference of the user. In some non-limiting embodiments, automated delivery system 102 may dispense the one or more items or cause the one or more items to be dispensed based on receiving a payment transaction authorization response message that includes an indication that the payment transaction was authorized. In some non-limiting embodiments, automated delivery system 102 may dispense an item by releasing the item from a storage location (e.g., a storage location of fulfillment device 106, a storage location of a vending machine, and/or the like). In some non-limiting embodiments, automated delivery system 102 may generate a display to cause an individual to prepare the item for a user. In some non-limiting embodiments, automated delivery system 102 may generate a display to cause an individual to release the item to the user.

In some non-limiting embodiments, automated delivery system 102 may perform an action based on dispensing the one or more items. In some non-limiting embodiments, automated delivery system 102 may transmit a confirmation message to user device 108 based on dispensing the one or more items. In some non-limiting embodiments, the confirmation message may include an indication that the payment transaction was authorized and/or an indication that the one or more items were dispensed.

In some non-limiting embodiments, automated delivery system 102 may forego processing the payment transaction involving the one or more items. For example, automated delivery system 102 may forego processing the payment transaction involving the one or more items based on determining to forego processing the payment transaction.

In some non-limiting embodiments, automated delivery system 102 may generate an item availability message that includes an indication that the one or more items are available. For example, automated delivery system 102 may generate an item availability message that includes an indication that the one or more items are available based on determining that the one or more items are available. In some non-limiting embodiments, automated delivery system 102 may transmit the item availability message to user device 108 based on generating the item availability message. In some non-limiting embodiments, automated delivery system 102 may determine a location of the item (e.g., coordinates of a location of the item, coordinates of a location of a fulfillment device, such as a vending machine, that includes the item, and/or the like). For example, automated delivery system 102 may determine the location of the item based on receiving an item release message. In some non-limiting embodiments, automated delivery system 102 may determine the location of the item as a location of the item in automated delivery system 102, a location of the item in a vending machine (e.g., a vending machine separate from automated delivery system 102), and/or the like.

In some non-limiting embodiments, POS device 104 may transmit an item release message to fulfillment device 106 to cause the item to be dispensed. The item release message may include an indication that the item should be dispensed by fulfillment device 106. In some non-limiting embodiments, fulfillment device 106 may determine a location of the item (e.g., coordinates of a location of the item). For example, fulfillment device 106 may determine the location of the item based on receiving the item release message from POS device 104. In some non-limiting embodiments, fulfillment device 106 may determine the location of the item as a location of the item in fulfillment device 106, a location of the item in a vending machine (e.g., a vending machine separate from fulfillment device 106), and/or the like.

As shown in FIG. 3, at step 308 ("NO" at step 304), process 300 includes performing an action associated with determining that the one or more items are not available. For example, automated delivery system 102 may perform an action associated with determining that the one or more items are not available. In some non-limiting embodiments, automated delivery system 102 may generate an item availability message that includes an indication that the one or more items are not available. For example, automated delivery system 102 may generate an item availability message that includes an indication that the one or more items are not available based on determining that the one or more items are not available. In some non-limiting embodiments, automated delivery system 102 may transmit the item availability message to user device 108 based on generating the item availability message. In some non-limiting embodiments, automated delivery system 102 may transmit an item availability message that includes an indication that the one or more items are not available to merchant system 112 based on determining that the one or more items are not available. In some non-limiting embodiments, merchant system 112 may provide the one or more items to automated delivery system 102 (e.g., to fulfillment device 106 of automated delivery system 102) based on demand for the one or more items.

In some non-limiting embodiments, automated delivery system 102 may perform an action associated with determining that one or more items are not available based on a profile that includes a list of item preferences that are ranked based on one or more item parameters associated with one or more items in the item preferences. For example, automated delivery system 102 may determine that a first item associated with a first item preference included in the list of item preferences is not available and automated delivery system 102 may determine whether a second item associated with a second item preference in a lower ranking position in the list of item preferences than the first item preference is available based on an item parameter associated with the second item. In some non-limiting embodiments, automated delivery system 102 may determine that the second item associated with second item preference included in the list of item preferences is not available and automated delivery system 102 may determine whether a third item associated with a third item preference in a lower ranking position in the list of item preferences than the second item preference is available based on an item parameter associated with the third item.

In some non-limiting embodiments, automated delivery system 102 may determine that a first item associated with an item preference of the user is not available and automated delivery system 102 may determine whether a second item associated with an item preference (e.g., the same item preference with which the first item is associated) is available based on determining that the first item associated with an item preference of the user is not available. In one example, automated delivery system 102 may determine that the first item associated with the first item preference of the user is not available. Automated delivery system 102 may determine one or more item parameters of the second item associated with an item preference of the user and automated delivery system 102 may determine that the second item is available based on the one or more item parameters of the second item. In the example above, automated delivery system 102 may determine the one or more item parameters of the second item based on an item parameter of the first item associated with the item preference of the user. In the example above, automated delivery system 102 may determine that the second item associated with the item preference of the user is not available and automated delivery system 102 may determine that a third item associated with an item preference of the user is available based on determining that the second item associated with the item preference of the user is not available. In some non-limiting embodiments, automated delivery system 102 may determine the one or more item parameters of the third item based on an item parameter of the first item associated with the item preference of the user or an item parameter of the second item associated with the item preference of the user.

In one example, automated delivery system 102 may determine that a first size of a brand of soda (e.g., a 20 ounce container of Coca Cola®) associated with an item preference of the user is not available and automated delivery system 102 may determine whether a second size of the brand of soda (e.g., a 12 ounce container of Coca Cola®) associated with the item preference is available based on determining that the first size of the brand of soda associated with the item preference of the user is not available. In such an example, automated delivery system 102 may dispense the second size of the brand of soda or cause the second size of the brand of soda to be dispensed.

In another example, automated delivery system 102 may determine that a first brand of soda (e.g., Coca Cola®) associated with a first item preference of the user is not available and automated delivery system 102 may determine whether a second brand of soda (e.g., Pepsi®) associated with a second item preference that is ranked in a lower position in a list of item preferences than the first item preference is available based on determining that the first brand of soda associated with the first item preference of the user is not available. In such an example, automated delivery system 102 may dispense the second brand of soda or cause the second brand of soda to be dispensed. In another example, automated delivery system 102 may determine that the second brand of soda associated with the second item preference of the user is not available and automated delivery system 102 may determine whether a third brand of soda (e.g., Dr. Pepper®) associated with a third item preference that is ranked in a lower position in the list of item preferences than the second item preference is available based on determining that the second brand of soda associated with the second item preference of the user is not available. In such an example, automated delivery system 102 may dispense the third brand of soda or cause the third brand of soda to be dispensed.

In some non-limiting embodiments, automated delivery system 102 may determine that a first item associated with a first item preference of the user is not available and automated delivery system 102 may determine that a second item associated with a second item preference of a user is available based on determining that the first item associated with the first item preference of the user is not available. For example, automated delivery system 102 may determine that the first item associated with the first item preference of the user is not available. Automated delivery system 102 may determine one or more item parameters of the second item associated with the second item preference of the user and automated delivery system 102 may determine that the second item is available based on the one or more item parameters of the second item. In some non-limiting embodiments, automated delivery system 102 may determine the one or more item parameters of the second item based on a profile that includes a list of item preferences of the user in order based on a user's priority of the item preferences. For example, automated delivery system 102 may determine one or more item parameters of the second item based on the profile, where the second item preference of the user has a lower priority than the first item preference of the user.

In some non-limiting embodiments, automated delivery system 102 may transmit an item availability message that includes an indication that a first item associated with an item preference of the user is not available and an indication that a second item associated with the item preference of the user is available. For example, automated delivery system 102 may transmit an item availability message based on determining that the first item is not available and that the second item is available.

Figure 4A:
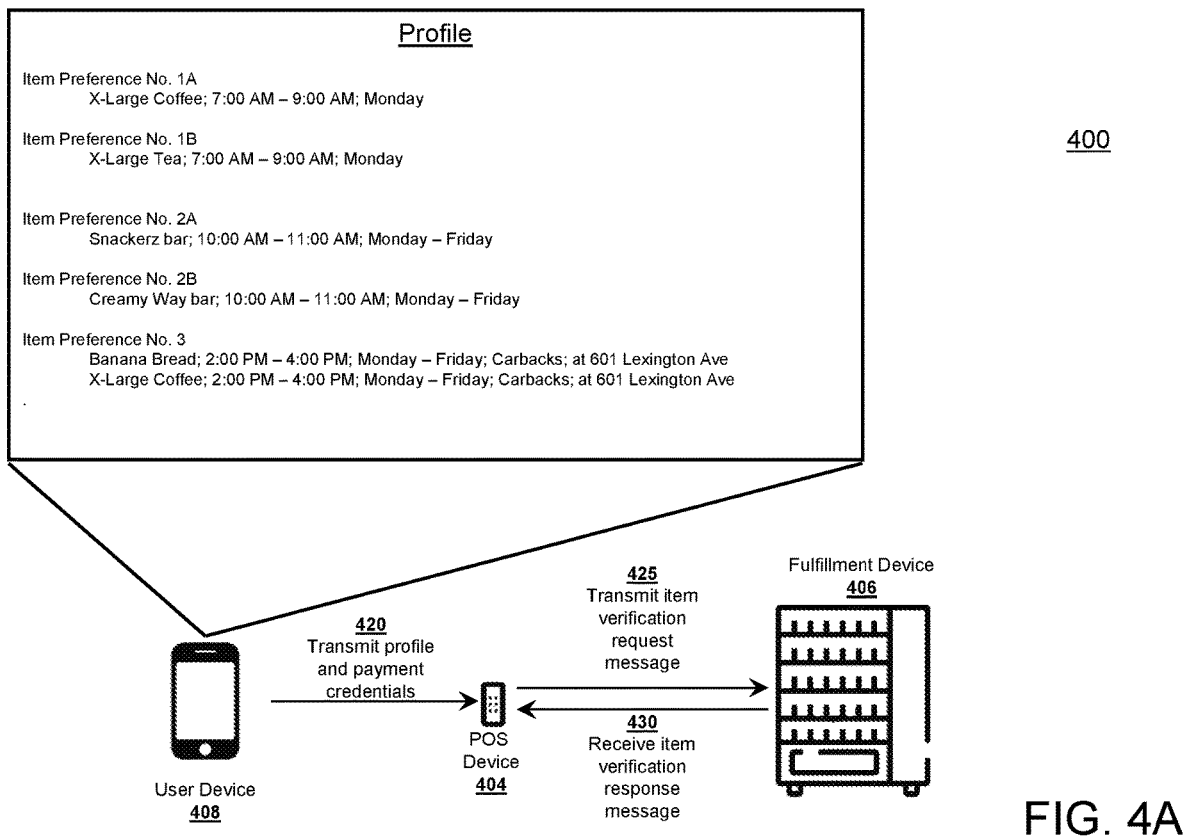
FIGS. 4A-4C are diagrams of an implementation of a non-limiting embodiment of a process for providing items based on an item preference.
Figure 4B:
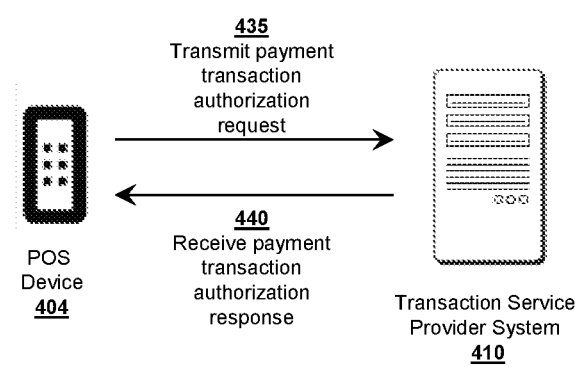
Figure 4C:
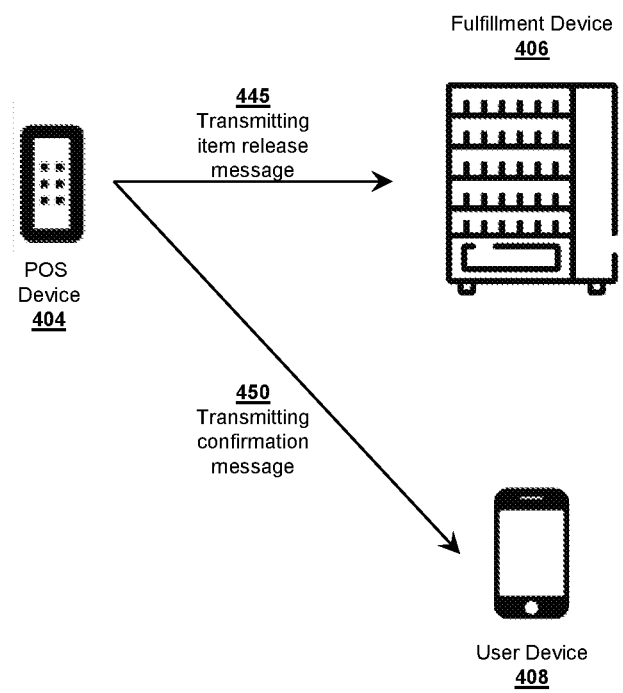

FIGS. 4A-4C are diagrams of an implementation 400 of a non-limiting embodiment of a process for providing items based on an item preference. As shown in FIGS. 4A-4C, implementation 400 may include POS device 404, fulfillment device 406, user device 408, and transaction service provider system 410. In some non-limiting embodiments, POS device 404 and/or fulfillment device 406 may be the same or similar to automated delivery system 102. In some non-limiting embodiments, user device 408 may be the same or similar to user device 108. In some non-limiting embodiments, transaction service provider system 410 may be the same or similar to transaction service provider system 110.

As shown by reference number 420 in FIG. 4A, user device 408 may transmit a transaction initiation message to POS device 404. For example, user device 408 may transmit the transaction initiation message to POS device 404 via a short range wireless communication connection. The transaction initiation message may include payment credential data associated with a payment credential (e.g., an account identifier of an account of a user, an account token associated with the account identifier, and/or the like) and/or preference data associated with one or more item preferences of a user. In some non-limiting embodiments, user device 408 may transmit a profile including a list of item preferences as the preference data associated with one or more item preferences of a user associated with user device 408.

As shown by reference number 425 in FIG. 4A, POS device 404 may transmit an item verification request message to fulfillment device 406. In some non-limiting embodiments, the item verification request message may include the preference data associated with the one or more item preferences received from user device 408.

As shown by reference number 430 in FIG. 4A, POS device 404 may receive an item verification response message from fulfillment device 406. For example, fulfillment device 406 may determine whether one or more items associated with the one or more item preferences are available based on the preference data included in the item verification request message. Fulfillment device 406 may generate an item verification response message based on determining that one or more items associated with the one or more item preferences are available (e.g., available for purchase by the user associated with user device 408). The item verification response message may include an indication that the one or more items are available. Fulfillment device 406 may transmit the item verification response message and POS device 404 may receive the item verification response message.

As shown by reference number 435 in FIG. 4B, POS device 404 may transmit a payment transaction authorization request message to transaction service provider system 410. For example, POS device 404 may transmit the payment transaction authorization request message to transaction service provider system 410. The payment transaction authorization request message may include data associated with the payment credential and/or data associated with a transaction amount of the payment transaction. POS device 404 may determine the transaction amount based on the one or more items after determining the one or more items associated with the one or more item preferences are available.

As shown by reference number 440 in FIG. 4B, POS device 404 may receive a payment transaction authorization response message from transaction service provider system 410. The payment transaction authorization response message may include an indication that the payment transaction is authorized. In some non-limiting embodiments, POS device 404 may transmit an indication that the payment transaction was authorized based on processing the payment transaction.

As shown by reference number 445 in FIG. 4C, POS device 404 may transmit an item release message to fulfillment device 406. For example, POS device 404 may transmit an item release message to fulfillment device 406 based on determining that the transaction is authorized based on receiving the payment transaction authorization response message from transaction service provider system 410. In some non-limiting embodiments, the item release message may cause the item to be dispensed from fulfillment device 406.

As shown by reference number 450 in FIG. 4C, POS device 404 may transmit a confirmation message to user device 408. For example, POS device 404 may transmit a confirmation message to user device 408 that includes an indication of whether the item release message was sent to fulfillment device 406 to cause fulfillment device 406 to dispense the one or more items. Additionally, or alternatively, POS device 404 may transmit a confirmation message to user device 408 that includes an indication of whether the payment transaction was authorized.

In this way, resources associated with communications between user device 408 and POS device 404, or an automated delivery system that includes POS device 404 and fulfillment device 406, may be reduced. In addition, the time it takes to conduct a payment transaction involving an item may be reduced. For example, an individual may engage POS device 404 with user device 408, and as a result of receiving the preference data associated with one or more item preferences of the user associated with user device 408, POS device 404 may process a payment transaction associated with an item and/or fulfillment device 406 may dispense the item desired by the user without the user manually providing input to indicate which items are desired. As a result, the time needed to complete a payment transaction is reduced, thereby freeing both POS device 404 and fulfillment device 406, for another user in less time as well as reducing the bandwidth consumed during communication between POS device 404 and other systems (e.g., with a transaction service provider system, a merchant system, and/or the like) during the payment transaction.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method comprising:
   determining, with at least one processor, whether a user device is within a predetermined distance based on a location of the user device;
   receiving, with at least one processor, preference data associated with one or more item preferences of a user of the user device when the user device is located within the predetermined distance;
   determining, with at least one processor, whether one or more items associated with an item preference of the user are available based on the preference data associated with one or more item preferences of the user; and
   processing, with at least one processor, a payment transaction involving the one or more items associated with the item preference of the user based on determining that the one or more items associated with the item preference of the user are available.

2. The method according to claim 1, further comprising:
   receiving, with at least one processor, payment credential data associated with a payment credential and a profile including a list of item preferences of a user.

3. The method according to claim 2, wherein the payment credential data associated with a payment credential comprises account identifier data associated with an account identifier of an account of the user; and
   wherein processing, with at least one processor, the payment transaction involving the one or more items associated with the item preference of the user comprises:
      processing, with at least one processor, the payment transaction involving the one or more items associated with the item preference of the user using the account identifier of the account of the user.

4. The method according to claim 2, wherein processing the payment transaction comprises:
   generating, with at least one processor, a payment transaction authorization request comprising the payment credential data associated with the payment credential and transaction data associated with a transaction amount of the payment transaction based on the one or more items associated with the item preference of the user;
   transmitting, with at least one processor, the payment transaction authorization request; and
   receiving, with at least one processor, a payment transaction authorization response based on the payment transaction authorization request.

5. The method according to claim 1, further comprising:
   transmitting, with at least one processor, a profile including a list of item preferences of the user;
   receiving, with at least one processor, an indication that an item associated with the list of item preferences of the user is available; and
   transmitting, with at least one processor, an indication that the payment transaction was authorized based on processing the payment transaction.

6. The method according to claim 1, further comprising:
   causing, with at least one processor, the one or more items to be dispensed based on processing the payment transaction involving the one or more items associated with the item preference of the user.

7. The method according to claim 1, further comprising:
   receiving, with at least one processor, payment credential data associated with a payment credential of the user and a profile including a list of item preferences of the user when the user device is located within the predetermined distance.

8. The method according to claim 7, wherein receiving, with at least one processor, the payment credential data associated with the payment credential of the user and the profile including the list of item preferences of the user comprises:
   receiving the payment credential data associated with the payment credential of the user and the profile including the list of item preferences of the user from the user device via a short range wireless communication connection.

9. A system comprising:
   at least one processor programmed or configured to:
      determine whether a user device is within a predetermined distance based on a location of a user device of a user;

receive preference data associated with an item preference of the user of the user device based on determining that the user device is located within the predetermined distance;

determine whether the item associated with the item preference of the user is available based on the preference data associated with the item preference of the user; and process a payment transaction involving the item associated with the item preference of the user based on determining that the item associated with the item preference of the user is available.

10. The system according to claim 9, wherein the at least one processor is further programmed or configured to:

receive payment credential data associated with a payment credential and a profile including a list of item preferences of a user.

11. The system according to claim 10, wherein the payment credential data associated with a payment credential comprises account identifier data associated with an account identifier of an account of the user; and wherein, when processing the payment transaction involving the item associated with the item preference of the user, the at least one processor is programmed or configured to:

process the payment transaction involving the item associated with the item preference of the user using the account identifier of the account of the user.

12. The system according to claim 9, wherein, when processing the payment transaction, the at least one processor is programmed or configured to:

generate a payment transaction authorization request comprising a payment credential and a transaction amount of the payment transaction based on the item associated with the item preference of the user;

transmit the payment transaction authorization request; and receive a payment transaction authorization response based on the payment transaction authorization request.

13. The system according to claim 9, wherein the at least one processor is further programmed or configured to:

transmit a profile including a list of item preferences of the user;

receive an indication that one or more items associated with the list of item preferences of the user are available; and transmit an indication that the payment transaction was authorized based on processing the payment transaction.

14. The system according to claim 9, wherein the at least one processor is further programmed or configured to:

cause the item to be dispensed based on processing the payment transaction involving the item associated with the item preference of the user.

15. The system according to claim 9, wherein the item associated with the item preference of the user is a first item associated with a first item preference of the user, and wherein the at least one processor is further programmed or configured to:

determine that the first item associated with the first item preference of the user is not available; and determine that a second item associated with a second item preference of the user is available based on determining that the first item associated with the first item preference of the user is not available.

16. The system according to claim 9, wherein the at least one processor is further programmed or configured to:

receive payment credential data associated with a payment credential from the user device of the user via a short range wireless communication connection.

17. A computer program product comprising at least one non-transitory computer-readable medium comprising one or more instructions that, when executed by at least one processor, cause the at least one processor to:

determine that a user device is within a predetermined distance based on a location of a user device of a user;

receive a profile including a list of item preferences of the user device based on determining that the user device is located within the predetermined distance;

determine that an item associated with an item preference of the user is available based on the list of item preferences of the user; and process a payment transaction involving the item associated with the item preference of the user based on determining that the item associated with the item preference of the user is available.

18. The computer program product according to claim 17, wherein the one or more instructions further cause the at least one processor to:

receive payment credential data associated with a payment credential; and wherein, the one or more instructions that cause the at least one processor to process the payment transaction involving the item associated with the item preference of the user, cause the at least one processor to:

process the payment transaction involving the item associated with the item preference of the user using the payment credential data associated with a payment credential.

19. The computer program product according to claim 17, wherein the one or more instructions further cause the at least one processor to:

transmit the profile including the list of item preferences of the user;

receive an indication that one or more items associated with the list of item preferences of the user are available; and transmit an indication that the payment transaction was authorized based on processing the payment transaction.

20. The computer program product according to claim 17, wherein the item associated with the item preference of the user is a first item associated with a first item preference of the user, and wherein the one or more instructions further cause the at least one processor to:

determine that the first item associated with the first item preference of the user in the list of item preferences is not available; and determine that a second item associated with a second item preference of the user is available based on determining that the first item associated with the first item preference of the user is not available.

* * * * *